(12) United States Patent
Jeong et al.

(10) Patent No.: US 8,155,013 B2
(45) Date of Patent: Apr. 10, 2012

(54) SYNCHRONIZED MULTI-LINK TRANSMISSION IN AN ARQ-ENABLED MULTI-HOP WIRELESS NETWORK

(75) Inventors: Moo Ryong Jeong, Albany, CA (US); Ismail Guvenc, Santa Clara, CA (US); Fujio Watanabe, Union City, CA (US)

(73) Assignee: NTT Docomo, Inc., Tokyo (JP)

(*) Notice: Subject to any disclaimer, the term of this patent is extended or adjusted under 35 U.S.C. 154(b) by 760 days.

(21) Appl. No.: 12/258,294

(22) Filed: Oct. 24, 2008

(65) Prior Publication Data
US 2009/0116420 A1   May 7, 2009

Related U.S. Application Data

(60) Provisional application No. 60/985,162, filed on Nov. 2, 2007.

(51) Int. Cl.
  *H04L 1/18* (2006.01)
  *H04L 12/28* (2006.01)
  *H04B 7/005* (2006.01)

(52) U.S. Cl. ........ 370/248; 370/252; 370/254; 370/278; 714/749

(58) Field of Classification Search .................. None
See application file for complete search history.

(56) References Cited

U.S. PATENT DOCUMENTS

| | | | | |
|---|---|---|---|---|
| 7,554,951 B2* | 6/2009 | Park et al. | | 370/331 |
| 7,782,817 B2* | 8/2010 | Yang et al. | | 370/329 |
| 7,853,220 B2* | 12/2010 | Love et al. | | 455/69 |
| 7,986,633 B2* | 7/2011 | Ryu et al. | | 370/252 |
| 2006/0209870 A1* | 9/2006 | Lee et al. | | 370/432 |
| 2006/0259846 A1* | 11/2006 | Bhushan | | 714/755 |
| 2007/0002858 A1* | 1/2007 | Bichot et al. | | 370/390 |
| 2007/0245201 A1* | 10/2007 | Sammour et al. | | 714/748 |
| 2008/0056227 A1* | 3/2008 | Love et al. | | 370/343 |
| 2009/0086666 A1* | 4/2009 | Guvenc et al. | | 370/328 |
| 2009/0092073 A1* | 4/2009 | Doppler et al. | | 370/315 |
| 2010/0095182 A1* | 4/2010 | Kim et al. | | 714/748 |
| 2010/0165873 A1* | 7/2010 | Higuchi et al. | | 370/254 |

OTHER PUBLICATIONS

International Preliminary Report on Patentability for Corresponding US Patent Application No. PCT/US2008/081369, May 14, 2010, 7 pgs.

Nakatsugawa, K., et al., "A proposal for synchronous MBS transmission in MR", IEEE 802.16 Broadband Wireless Access Working Group, Jan. 18, 2001, 6 pages.

Nakatsugawa, K., et al., "MBS Synchronization", IEEE 802.16 Presentation Submission Template, Apr. 25, 2007, 4 pages.

Chion, M., et al., "Synchronous MBS Transmission for Macro Diversity in MR Networks", IEEE 802.16 Broadband Wireless Access Working Group, Jul. 5, 2007, 8 pages.

(Continued)

*Primary Examiner* — Gregory Sefcheck
(74) *Attorney, Agent, or Firm* — Blakely, Sokoloff, Taylor & Zafman LLP

(57) ABSTRACT

A method and apparatus is disclosed herein for synchronized multi-link transmission in an ARQ-enabled multi-hop wireless network. In one embodiment, the method comprises performing pre-transmission of a packet to hops to enable a base station and the plurality of hops in the network to transmit the packet synchronously to one or more mobile stations in the wireless communication system; and performing one or more re-transmissions of the packet at a set of one or more hops forming a path in the network if time remaining before a synchronized transmission time for the path as a whole is greater than a threshold.

24 Claims, 8 Drawing Sheets

OTHER PUBLICATIONS

IEEE Computer Society and IEEE Microwave Theory and Techniques Society, "802.16 IEEE Standard for Local and Metropolitan Area Networks; Part 16: Air Interface for Fixed Broadband Wireless Access Systems", Oct. 1, 2004, 892 pages.

IEEE Computer Society and IEEE Microwave Theory and Techniques Society, "802.16 IEEE Standard for Local and Metropolitan Area Networks; Part 16: Air Interface for Fixed Broadband Wireless Access Systems; Amendment 2: Physical and Medium Access Control Layers for Combined Fixed and Mobile Operation in Licensed Bands and Corrigendium 1", Feb. 28, 2006, 864 pages.

Relay Task Group of IEEE 802.16, "baseline Document for Draft Standard for Local and Metropolitan Area Networks: Part 16: Air Interface for Fixed Broadband Wireless Access Systems; Multihop Relay Specification", Jun. 6, 2007, 203 pages.

Yang, Liu, et al., "Synchronous MBS Transmission for Macro Diversity in MR Networks", Interne Citation <http://wirelessman.org/relay/contrib/C80216j-07_446r3.doc>, Jul. 5, 2007, pp. 1-9.

Nakatsugawa, Keiichi, et al., "A proposal for synchronous MBS Transmission in MR", IEEE C802.16J-07/005R3 [online] <http://www.ieee802.org/16/relay/contrib/C80216j-07_005r3.pdf>, Jan. 18, 2007, pp. 1-6.

PCT International Search Report for PCT Application No. PCT/US2008/081369, dated Apr. 24, 2009, 3 pages.

PCT Written Opinion of the International Searching Authority for PCT Application No. PCT/US2008/081369, dated Apr. 24, 2009, 7 pages.

* cited by examiner

Perform pre-transition of a packet to hops to enable a base station and the plurality of hops in the network to transmit the packet synchronously to one or more mobile stations in the wireless communication system
311

Perform one or more re-transmissions of the packet at a first set of one or more hops forming a path in the network if time remaining before a synchronized transmission time for the path as a whole is greater than a threshold
312

FIG. 3A

SYNCHRONIZED MULTI-LINK TRANSMISSION IN AN ARQ-ENABLED MULTI-HOP WIRELESS NETWORK

PRIORITY

The present patent application claims priority to and incorporates by reference the corresponding provisional patent application Ser. No. 60/985,162, titled, "Synchronized Multi-Link Transmission in an ARQ-Enabled Multi-Hop Wireless Network," filed on Nov. 2, 2007.

RELATED APPLICATIONS

This application is related to the co-pending application entitled A METHOD FOR ARQ-ENABLED PRE-TRANSMISSIONS IN MULTICAST AND BROADCAST SERVICES OF RELAY NETWORKS UTILIZING THE IDLE PERIODS, filed on Sep. 16, 2008, U.S. patent application Ser. No. 12/211,611, assigned to the corporate assignee of the present invention.

FIELD OF THE INVENTION

The present invention relates generally to multi-hop wireless networks and wireless stations therein and more particularly to transmissions in an ARQ-enabled multi-hop network to support synchronized transmission over multiple links.

BACKGROUND OF THE INVENTION

FIG. 1 shows an exemplary multi-hop wireless network. Referring to FIG. 1, a multi-hop wireless network comprises a number of wireless stations, which can be classified as a base station (BS), a relay station (RS), and subscriber station (SS) according to how the station functions in terms of delivery of packets from/to outer networks. A subscriber station (SS), such as SS 101 of FIG. 1, may or may not be mobile. When a subscriber station is mobile, it is sometimes denoted as a mobile station (MS).

In the downlink, a base station 102 introduces packets of outer networks into the multi-hop network, while subscriber station 101 consumes or terminates the packets. In the uplink, subscriber station originates packets while base station 102 introduces the packets into outer networks. A relay station, such as RS1, RS2 or RS3, resides on the path between base station 102 and subscriber station 101, and relays packets for either uplink or downlink. For purposes herein, a subscriber station may include, but is not limited to, phones, laptops, desktops, PDAs, and so on.

Through one or more switches and/or routers (not shown), base station 101 is connected to an outer network (not shown), which may be either a wired network or a wireless network. The outer network may be again a multi-hop wireless network.

In a multi-hop wireless network, a wireless link may serve as an access link, a relay link or both. With reference to FIG. 1, a wireless link serves as an access link if packets being transmitted over the link are received or transmitted by a subscriber station that is attached to the link. A wireless link serves as a relay link if packets being transmitted over the link are received and transmitted by a base station or a relay station. A wireless link serves both as a relay link and an access link if packets being transmitted over the link are received by both a relay station and a subscriber station.

The coverage of a base station and a relay station may take various shapes according to antennas, obstacles, channel conditions, and so on. Depending on its location and the deployment of base station and relay stations, a subscriber station may be within the coverage of one or more other wireless stations.

To increase the receiving performance using macro diversity, transmissions over multiple links are often synchronized. For example, to increase the receiving performance of a subscriber station, transmission at the multiple access links associated with the subscriber station can be synchronized. The transmission can be a unicast transmission to the specific station (as in soft handoff and cooperative communication) or a multicast or broadcast transmission to a plurality of stations (as in multicast and broadcast service). As another example, to increase the receiving performance of a relay station or a base station, transmission at the multiple relay links associated with the relay station or the base station can be synchronized. The transmission at the synchronized multiple-link may be either uplink (in the direction toward the base station) or downlink (in the direction toward the subscriber stations). Hereinafter, for purposes herein, the related art and embodiments of the present invention are illustrated with reference to the synchronized transmission in the access links that are downlink. Therefore, the synchronized links are assumed be an access link, although in general they can be access link, relay link and so on. Also, the packets for the synchronized transmission are assumed to be introduced by the base station, delivered in the downlink direction, and consumed by the subscriber stations, although in general the packets may be generated and consumed by any of the base station, relay stations, and subscriber stations, and the packet can transmitted either in downlink direction or uplink direction. It should be noted, however, the present invention can be easily extended to the general cases where such assumptions may not necessarily hold.

On receiving multiple signals from multiple transmitters (each transmitter being either base station or relay station), a subscriber station may apply diversity combining such as selection combining and maximal-ratio combining to obtain improved signal.

Synchronized transmission requires delay control along the paths to the access links in which the synchronized transmission is to occur. Because of the difference in the number of relay stations in the path, the difference in propagation delays in each link, the difference in the processing delay within each relay station, and the difference in channel status, the delay along a path may not necessarily the same with each other. The transmission time for synchronized transmission, therefore, is generally determined by taking into account the longest delay out of the delays in all the paths. For the packet transmission along the path other than the path incurring the longest delay, an artificial delay must be introduced so that transmission in multiple links should be synchronized.

Synchronized transmission methods for multicast and broadcast service are known. In one such method, each relay station reports its processing delay to the base station as a capability parameter. The base station then determines the maximum cumulative delay of all relay stations in the multicast and broadcast service zone based on their positions in the tree and their individual processing delays. The base station then calculates the required waiting time, Wi, for each relay station based on the value of the maximum cumulative delay and each relay station's cumulative delay and notify each relay station of its waiting time. When synchronized multicast and broadcast transmission is necessary, the base station forwards the data over the relay downlink as a pre-transmission a number of frames equal to the maximum cumulative delay before transmitting this data over the access link. Each relay station in the multicast and broadcast zone forwards the data it receives over the relay downlink. Finally, once the base station has waited a number of frames equal to the maximum cumulative delay and each relay station has waited its specified waiting time, Wi, the base station and relay station synchronously transmits the data over the access link. However, this particular approach has no considerations on the channel errors in the wireless link. If a channel error occurs for a packet transmitted in a link, all the relay stations and the access stations in the forward path from the link cannot receive the packet correctly; hence, the packet is not available for the synchronized transmission.

In another synchronized transmission method for multicast and broadcast service, each relay station reports its processing delay to the base station as a capability parameter and the base station then determines the maximum cumulative delay of all relay stations in the multicast and broadcast service zone based on their positions in the tree and their individual processing delays as in the previously described synchronized transmission method; in contrast, however, in this synchronized transmission method, the base station determines target transmission frame over access link for each synchronized data burst based on maximum cumulative delay and other base station information. If ARQ is enabled over a relay link, the base station may select target transmission frame to accommodate the delay due to ARQ retransmission on the relay link. The base station includes the frame number of the target transmission frame with each packet. The relay station transmits the packet to subscriber stations over access link at target transmission frame. The intermediate relay station relays the packet to its subordinate relay station based on the constraints of QoS parameters for the relay connection for the packet. During connection setup for a subscriber station, if a relay path with suitable characteristics, such as per-hop QoS configuration, is not available, the base station may initiate the creation of a new relay path with the required characteristics, such as per-hop QoS configuration. The QoS parameters of any of the constituent per-hop connections on an existing relay path may be changed by the base station.

Also, in this synchronized transmission method, if a relay station fails to transmit a packet at its target transmission frame, the relay station informs the base station of the failure. The relay station includes the duration of late arrival for this packet in units of frames. In addition, a relay station may provide early arrival information to the base station if the relay station determines a packet has arrived earlier than Relay Data Early Arrival Report Threshold to its target transmission frame. With early arrival detection, the relay station includes the number of frames exceeding the threshold that the packet has waited to be transmitted. When Relay Data Early Arrival Report Threshold is set to 0, the early arrival reporting is disabled.

FIG. 2 illustrates an exemplary ARQ state diagram for a transmitter. When a packet is transmitted, ARQ state transits to the "Outstanding" state. If ACK is received within ARQ_RETRY_TIMEOUT, ARQ state transits to the "Done" state. If ARQ_RETRY_TIMEOUT expires without receiving ACK or if NACK is received from the receiver, the packet is retransmitted while ARQ state is transiting from "Outstanding" to "Waiting for retransmission" and then from "Waiting for retransmission" to "Outstanding." If ARQ_BLOCK_LIFETIME expires while ARQ state is in the "Outstanding" state or in the "Waiting for retransmission" state, the packet is discarded. Therefore, a packet may be either correctly transmitted or discarded after ARQ_BLOCK_LIFETIME, and the longest delay happens when it is discarded. ARQ_BLOCK_LIFETIME is chosen so that one or more retransmissions can be accommodated before the lifetime expires.

SUMMARY OF THE INVENTION

A method and apparatus is disclosed herein for synchronized multi-link transmission in an ARQ-enabled multi-hop wireless network. In one embodiment, the method comprises performing pre-transmission of a packet to hops to enable a base station and the plurality of hops in the network to transmit the packet synchronously to one or more mobile stations in the wireless communication system; and performing one or more re-transmissions of the packet at a set of one or more hops forming a path in the network if time remaining before a synchronized transmission time for the path as a whole is greater than a threshold.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 3A is a flow diagram of one embodiment of a retransmission process.

DETAILED DESCRIPTION OF THE PRESENT INVENTION

Figure 1:
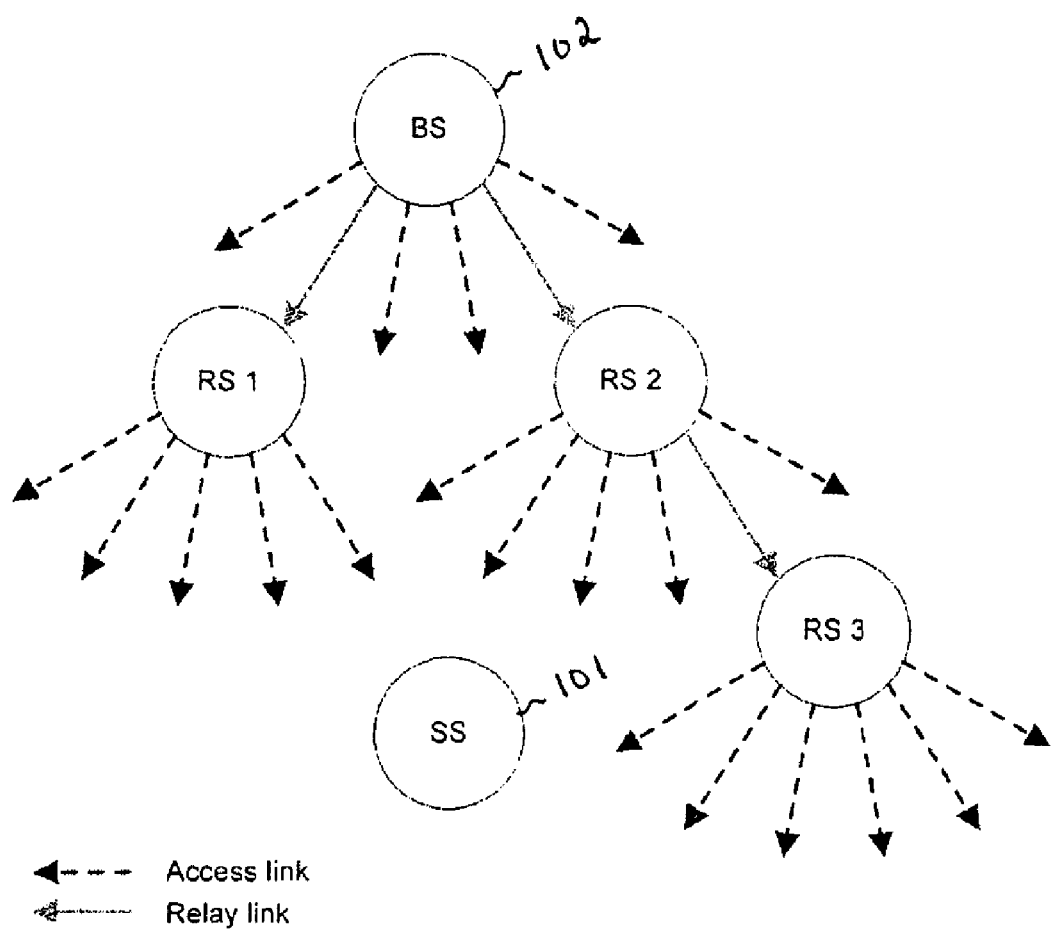
FIG. 1 illustrates a Multi-hop network.

Methods and apparatuses for enabling synchronized multi-link transmission in an ARQ-enabled multi-hop network without introducing unnecessarily large delay are described.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

Apparatuses and methods for transmissions in an Automatic Repeat-reQuest (ARQ)-enabled multi-hop network to support synchronized transmission over a specific set of links (referred to herein as synchronized links) are described.

FIG. 3A is a flow diagram of one embodiment of a retransmission process. The process is performed by processing logic that may comprise hardware (circuitry, dedicated logic, etc.), software (such as is run on a general purpose computer system or a dedicated machine), or a combination of both.

Referring to FIG. 3A, the process begins by processing logic performing pre-transmission of a packet to hops to enable a base station and the plurality of hops in the network to transmit the packet synchronously to one or more mobile stations in the wireless communication system (processing block 311).

Next, processing logic performs one or more re-transmissions of the packet at a set of one or more hops forming a path in the network if time remaining before a synchronized transmission time for the path as a whole is greater than a threshold (processing block 312). In one embodiment, the threshold is determined based on one or more of a group consisting of: link retransmission delays for the links on a forward path, channel characteristics of the links on the forward path, the topology of the multi-hop network, QoS requirements including delay requirements and/or packet loss requirements, a normal forward path delay and a path retransmission budget for the path. In another embodiment, the threshold is zero. In yet another embodiment, the threshold is a normal forward normal path delay. In still another embodiment, the threshold is the sum of a normal forward path delay and one or more link retransmission delays for one or more links in the forward path. In still a further embodiment, the threshold is the sum of a normal forward path delay and an ARQ block lifetime for one or more links in the forward path.

In one embodiment, the method further comprises determining the synchronized transmission time of the packet over the synchronized links, and in such a case, performing one or more re-transmissions of the packet at the set of one or more hops forming a path in the network by resending the packet between any two stations on a path according to ARQ on at least one of the links on the path if time remaining for the path as a whole before the synchronized transmission is greater than a threshold.

In one embodiment, the synchronized transmission time of the packet over the synchronized links is determined based on the transmission time offset and the link transmission time of the packet. In such a case, in one embodiment, the method further comprises determining a normal link delay and a link retransmission delay for each relay link on each path from the base station to an access station that is associated with a synchronized link, determining the transmission time offset based on the normal link delays and the link retransmission delays, and determining, upon arrival of the packet at the base station, a link transmission time of the packet over the next relay link.

In one embodiment, the transmission time offset is determined based on taking the maximum value among the path delay budgets for all the paths. In one embodiment, a path delay budget is determined for each path from the base station to an access station, based on the sum of the normal path delay and the path retransmission budget, when determining the transmission time offset.

In one embodiment, the link transmission time of the packet over the next relay link is based on one or more of packet arrival time, packet processing time of the base station, and Quality of Service (QoS) provisioning of the packet. In another embodiment, the link retransmission delay for a link is based on the time required for an ARQ retransmission over the link. In yet another embodiment, the link transmission time of the packet over the next relay link is determined upon arrival of the packet at the base station.

In one embodiment, a normal path delay for the path is determined for each path from the base station to an access station, based on the sum of all the normal link delays for the links on the path, when determining the transmission time offset. In another embodiment, a normal forward path delay for each wireless station on a path from the base station to an access station is determined based on the sum of the normal link delays for the links from the wireless station and the access station.

In one embodiment, a path retransmission budget is determined for each path from the base station to an access station, based on the link retransmission delays for the links on the path, when determining the transmission time offset. In another embodiment, the path retransmission budget is based on one or more of a group consisting of: channel characteristics of the links on the path, the topology of the multi-hop network, QoS requirements including delay requirements and/or packet loss requirements, a normal path delay and a path retransmission budget for other paths. In yet another embodiment, the path retransmission budget for a path is large enough to accommodate a link retransmission delay of a link on the path from the base station to the access station but smaller than the sum of the link retransmission delays of the path.

In one embodiment, the process of FIG. 3A further comprises transmitting the packet at the synchronized transmission time of the packet.

In one embodiment, the process of FIG. 3A further comprises discarding a packet in an ARQ-enabled link. This may occur if time remaining before a synchronized transmission time for the path as a whole is less than a threshold by a transmitting station sending an ARQ discard message for the packet to a receiving station. In one embodiment, discarding a packet comprises a receiving station discarding the packet and sending an acknowledgement for the ARQ discard message when receiving an ARQ discard message for a packet from a transmitting station. In another embodiment, discarding a packet comprises a station advancing the ARQ windows associated with the packet. In yet another embodiment, discarding a packet in a link occurs if an ARQ block lifetime expires for the packet, and a path retransmission budget for a path is large enough to accommodate a link retransmission delay of a link on the path from the base station to the access station but smaller than the sum of the ARQ block lifetime for all the links in the path. In still another embodiment, discarding a packet in a link occurs if the number of retransmission of a packet exceeds a retry limit of the link, and a path retransmission budget for a path is large enough to accommodate a link retransmission delay of a link on the path from the base station to the access station but smaller than the sum of the time required for the retry limit number of times of retransmission.

Figure 3B:
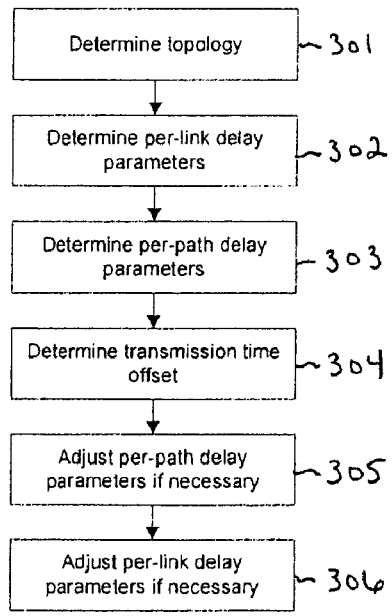
FIG. 3B is a flow diagram of one embodiment of a scheduling process.

FIG. 3B is a flow diagram of one embodiment of a process for determining various delay parameters that can be used for synchronized multi-link transmission. The process is performed by processing logic that may comprise hardware (circuitry, dedicated logic, etc.), software (such as is run on a general purpose computer system or a dedicated machine), or a combination of both. This process can be executed either in a central manner or in a distributed manner. In one embodiment, a centralized scheduler in a base station performs the entire process. In another embodiment, a scheduler is distributed to more than one wireless station, and some or all of the operations in FIG. 3B are executed by a base station, relay stations or subscriber stations in a distributed manner. In such a case, the outcome of an operation performed by a wireless station is exchanged with other wireless stations whenever necessary.

Hereinafter, for ease of understanding, embodiments of the present invention are explained with reference to a centralized scheduler unless otherwise stated. Also, the multi-hop network as illustrated FIG. 1 is referenced.

Referring to FIG. 3B, the scheduler determines the network topology for the multi-link synchronized transmission (processing block 301). The topology may be the same as the topology of the multi-hop network. For example, when the multi-link synchronized transmission is a broadcast transmission, the base station and all the relay stations in the multi-hop network participate in the multi-link synchronized transmission through the access links; hence the topologies are the same. On the other hand, the topology may be a subset of the topology of the multi-hop network according to the location of the subscriber stations, the coverage of the base station and the relay stations, the type of transmission (whether it is unicast, multicast, or broadcast), and so on.

Figure 4:
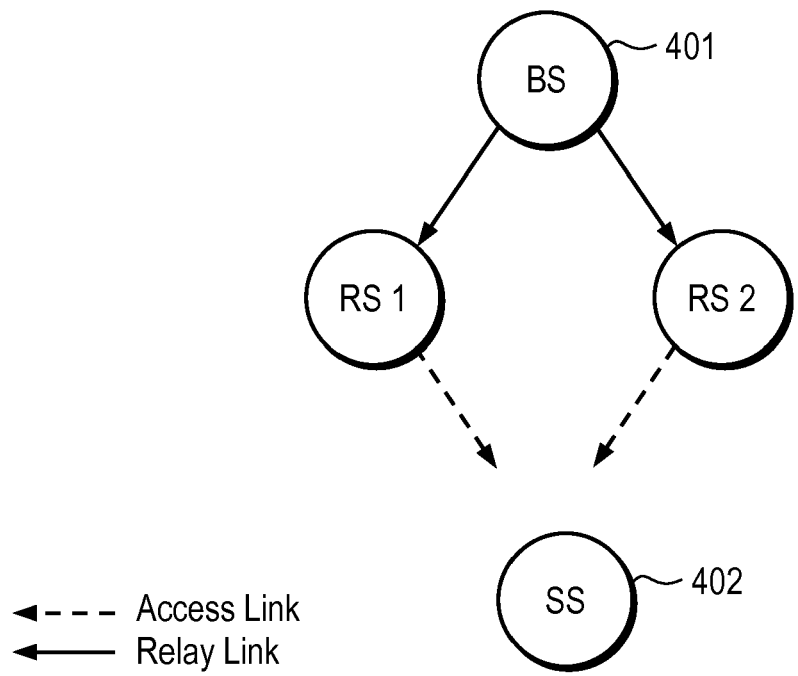
FIG. 4 illustrates a topology example.

FIG. 4 illustrates an exemplary network topology constructed from the multi-hop network as shown in FIG. 1. In this example, there is only one subscriber station 402 that receives the synchronized multi-link transmission, and subscriber station 402 is in the coverage of two relay stations, RS 1 and RS 2. There are two access links to subscriber station 402: one from the relay station, RS 1, and the other from the relay station, RS 2. Also, there are two relay paths to the access links, each path comprising one relay link.

Figure 5:
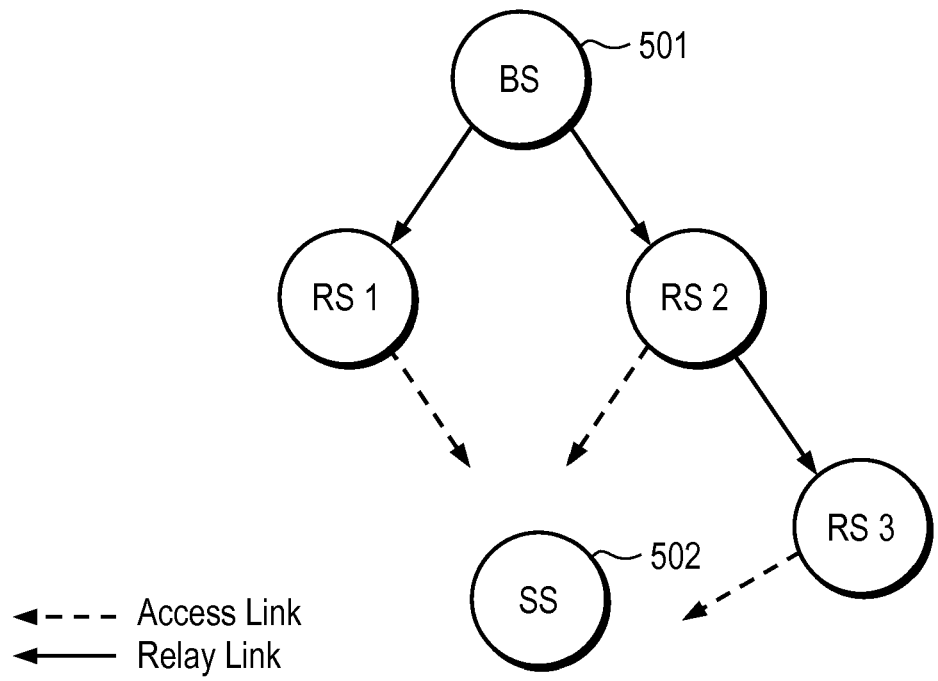
FIG. 5 illustrates another topology example.

FIG. 5 illustrates another exemplary network topology constructed from the multi-hop network as shown in FIG. 1. Unlike the previous example of FIG. 4, the subscriber station 502 in this example is in the coverage of three relay stations, RS 1, RS 2, and RS 3. There are three access links to subscriber station 502, each from one of the three relay stations. Also, there are three relay paths to the access links from base station 501. Hereinafter, the relay paths and the links on the path are indexed as follows for the sake of explanation. The relay paths from base station 501 to the relay station RS 1, RS 2, and RS 3 are respectively indexed as the $1^{st}$ path, the $2^{nd}$ path, and the $3^{rd}$ path. Similarly, the links of each path is indexed, starting from the links attached to base station 501. The $1^{st}$ path comprises only one link from base station 501 and the relay station RS 1, which is indexed as the $1^{st}$ link of the $1^{st}$ path. The $2^{nd}$ path also comprises only one link from base station 501 and the relay station RS 2, which can be indexed similarly. On the other hand, the $3^{rd}$ path comprises two links, one from base station 501 to the relay station, RS 2 (indexed as the $1^{st}$ link of the $3^{rd}$ path), and the other from the relay station, RS 2 to the relay station, RS 3 (indexed as the $2^{nd}$ link of the $3^{rd}$ path).

Note the $2^{nd}$ path (the relay path from base station 501 to the relay station RS 2) is a sub-path of the $3^{rd}$ path (the relay path from base station 501 to the relay station RS 3). As far as FIG. 3 is concerned, there is no need to consider a relay path that is a sub-path of another relay path; the resultant delay parameters do not change with or without such a consideration. Therefore, for the sake of the scheduling example, only two relay paths are considered.

Referring back to FIG. 3, processing logic determines the per-link delay parameters for each link on the relay paths (processing block 302). In one embodiment, the per-link delay parameters include two different sets of parameters. One set of delay parameters relates to the delays that are experienced by an initial transmission of a packet regardless of whether ARQ is enabled over the link. In one embodiment, this set of delay parameters includes the packet processing delay such as the address matching, packet classification and routing, the scheduling delay, the propagation delay of a link, the packet transmission delay, and other processing delays required for the processing and the transmission of a packet if the relay performs the specific process, but it does not include an artificial delay that is posed to synchronize the multi-link transmissions. The other set of delay parameters relates to the delays that are required for the retransmission of a packet when ARQ is enabled. In one embodiment, this set of delay parameters includes the delay for a receiver to send ACK or NACK, the delay for a transmitter to wait before it commences retransmission (e.g. ARQ_RETRY_TIMEOUT of FIG. 2), and the delay required to process and retransmit the packet. If ARQ is not enabled over the link this set of the parameters are not necessary, or may be set to appropriate default values.

In one embodiment, for each link j of a path i, the delay related with the initial transmission is combined to generate a normal link delay, $d_{i,j}^N$, indicating the time required for a successful packet transmission. Similarly, for each link j of a path i, the delay related with the retransmission is combined to generate a link retransmission delay, $d_{i,j}^R$, indicating the time required for a round of ARQ packet retransmission over the link. In one embodiment, if ARQ is disabled for the link j of the path i, the link retransmission delay, $d_{i,j}^R$, is set to zero.

Next, processing logic determines the per-path delay parameters for each relay path (processing block 303). Again, the per-path delay parameters include at least two different parameters. One parameter, denoted herein as the normal path delay of a path i, $D_i^N$, relates to the delay that is experienced by a packet successfully transmitted from the base station to the relay station on the other end of the path without retransmission in any of the links on the path. In one embodiment, the normal path delay of a path is determined as the sum of the normal link delays of the all links on the path. For example, the normal path delay of the i-th path is $$D_i^N = \sum_{j \in L_i} d_{i,j}^N$$

where $L_i$ is a set of all links on the i-th path.

The other delay parameter, denoted herein as the path retransmission budget of a path i, $D_i^R$, relates to the time that may be used to retransmit a packet. As long as the total time for the retransmissions does not exceed the path retransmission budget, the retransmission may happen in any link of the path for any number of times. This enables the reserved retransmission time to be shared by a plurality of links in a number of ways. Also it gives flexibility that enables one to make tradeoffs between the quality enhancement (through retransmission) and the delay of the packet transmission by implementing appropriate sharing of the reserved retransmission time by multiple links.

In one embodiment, the path retransmission budget of a path is determined based on the link retransmission delays for the links on the path. In one embodiment, the path retransmission budget of a path i, $D_i^R$ is determined by summing the appropriately weighted link retransmission delays, as follows:

$$D_i^R = \sum_{j \in L_i} a_{i,j} d_{i,j}^R$$

where $L_i$ is a set of all links on the i-th path.

A weighting parameter, $a_{i,j}$, is a non-negative real number indicating the number of retransmission on the j-th link of the i-th path. The number is not necessarily an integer, and it can be determined probabilistically. For example, $a_{i,j}$ can be determined as the average number of retransmission considering the retransmission probability:

$$a_{i,j} = \sum_k k \cdot p_{i,j,k}$$

where k is the number of retransmissions and $p_{i,j,k}$ is a probability of k times of retransmissions on the j-th link of the i-th path. In another embodiment, the path retransmission budget of a path i, $D_i^R$ is determined by summing the appropriately weighted ARQ parameter, such as ARQ_BLOCK_LIFETIME of FIG. 2. In one embodiment, the path retransmission budget is determined as follows:

$$D_i^R = \sum_{j \in L_i} b_{i,j} \cdot \text{ARQ\_BLOCK\_LIFETIME}_{i,j}$$

where $L_i$ is a set of all links on the i-th path. ARQ_BLOCK_LIFETIME$_{i,j}$ is an ARQ parameter of the j-th link of i-th path, indicating the maximum time that a transmitter may wait without receiving an ACK before it discards a packet. In one embodiment, the weighting parameter, $b_{i,j}$, is a non-negative real number that is not greater than 1. More specifically, in one embodiment, $b_{i,j}$ is determined by the probability of transmitter's ARQ timer reaching ARQ_BLOCK_LIFETIME$_{i,j}$ without receiving ACK.

When $a_{i,j}$=RETRY_LIMIT$_{i,j}$ for all j or $b_{i,j}$=1 for all j, the path retransmission budget, $D_i^R$, is large enough to accommodate the worst case scenario where a packet is retransmitted at each link on the path with the maximum number of times that are allowed by ARQ mechanism. If $a_{i,j}$<RETRY_LIMIT$_{i,j}$ for some j or $b_{i,j}$<1 for some j, the path retransmission budget, $D_i^R$, may not accommodate the number of retransmissions as required in a certain scenario (e.g., the path retransmission budget is used up by the links in the upstream links). When $a_{i,j}$=0 for all j or $b_{i,j}$=0 for all j, there can be no retransmission on the path i.

In one embodiment, the weighting parameters $a_{i,j}$ and $b_{i,j}$ are determined considering one or more of the followings: the channel characteristics of the links on the path, the topology of the multi-hop network, ARQ mechanism, QoS requirements including delay requirements and/or packet loss requirements, the normal path delay and the path retransmission budget for other paths. For example, when the channel state of a link is bad, the weighting parameter of the link may be increased to meet a certain packet loss requirement. Increased $a_{i,j}$ and $b_{i,j}$ allow the increased number of retransmissions as well as the increased waiting time before a packet is discarded (within the limit that is allowed by ARQ mechanism). As another example, a weighting parameter of a link that is close to the base station or serving many relay stations and subscriber stations may be increased. The successful transmission over the link is important because it is located in the root of the topology and thus affects many other links. As yet another example, weighting parameters may be decreased to meet the total delay requirement of the path. When the normal path delay and the path retransmission budget for other paths are known, those information can also be used. For example, when the sum of the normal path delay and the path retransmission budget for the path m is greater than such a sum of the path n, the path retransmission budget for the path n may be increased by the difference.

In one embodiment, a path delay budget of each path, $D_i$, is determined based on the normal path delay and the path retransmission budget as follows:

$$D_i = D_i^N + D_i^R$$

For purposes herein, the path delay budget is a total time that can be consumed by a packet while it is transmitted within a path from the base station to an access station. Some portion of the time is consumed by the initial transmission of a packet while some other portion of the time is consumed by the retransmissions.

Referring back to FIG. 3B, processing logic determines the transmission time offset, denoted as $T_{TxOff}$ (processing block 304). In one embodiment, processing logic determines the transmission time offset by taking the largest value among the path delay budgets of all paths as follows:

$$T_{TxOff} = \max_{i \in P}\{D_i\}$$

where P is a set of all paths on the network or the topology.

By taking the largest path delay budget as the transmission time offset, the path retransmission budgets of all the paths are at least accommodated for. First, the path having the largest path delay budget will be allocated with the reserved time that can be used for retransmission is exactly the same as budgeted by the path retransmission budget. On the other hand, the paths having the smaller path delay budget than the largest will be allocated reserved time more than budgeted by the path retransmission budgets. To take advantage of the large reserved time in favor of additional reliability, the path retransmission budget and other per-link and per-path delay parameters of the paths may be adjusted in the optional processing blocks 305 and 306, where processing logic adjusts the per-path delay parameters if necessary and processing logic adjusts the per-link delay parameters if necessary, respectively.

In another embodiment, the transmission time offset is determined by taking the value which is smaller than the largest value among the path delay budgets of all paths.

$$T_{TxOff} < \max_{i \in P}\{D_i\}$$

where P is a set of all paths on the network or the topology.

This may happen, for example, when the total delay requirement from the base station to the subscriber station was not considered while determining the weighting parameters in processing block 303 of FIG. 3 and the resultant path delay budget of the path is greater than the total delay requirement.

For the paths having the path delay budget larger than the transmission time offset, the path retransmission budget and other per-path and per-link delay parameters should be adjusted in the optional processing blocks 305 and 306 so that the adjusted path delay budget can be accommodated in the transmission time offset. If the parameters are adjusted, it is ensured that the retransmission as budgeted by the path retransmission budget is accommodated within the transmission time offset. Otherwise, the budgeted retransmission may not be accommodated. For the paths having the path delay budget smaller than the transmission time offset, the path retransmission budget and other per-path and per-link delay parameters may also be adjusted in the optional processing blocks 305 and 306 to accommodate more retransmission.

The transmission time offset is typically not smaller than the normal path delay of any path to accommodate at least the time for initial transmission of the packets over the links on the path.

$$T_{TxOff} \geq D_i^N, \forall i \in P$$

where P is a set of all paths on the network or the topology.

As set forth above, after determining the transmission time offset, processing logic optionally adjusts the per-path delay parameters (processing block 305). As explained with reference to processing block 304, the adjustment may either increase or decrease the path retransmission budgets of one or more paths.

In one embodiment, the path retransmission budget and the path delay budget is adjusted based on the transmission time offset, the normal path delay, and the link scheduling margin of the $1^{st}$ link of each path, $D_{i,1}^{SM}$, which is an optional link parameter to fine tune the delay parameters considering the practical scheduling limitation. For example, the adjusted path delay budget, $\tilde{D}_i$, is obtained based on the transmission time offset and the link scheduling margin, and the adjusted path retransmission budget, $\tilde{D}_i^R$, is obtained based on the difference between the adjusted path delay budget and the normal path delay as follows:

$$\tilde{D}_i = T_{TxOff} - D_{i,1}^{SM}$$

$$\tilde{D}_i^R = \tilde{D}_i - D_i^N = T_{TxOff} - D_{i,1}^{SM} - D_i^N$$

At processing block 306, processing logic adjusts the per-link path delay parameters based on the result of performing processing block 305. In one embodiment, for a path whose adjusted path delay budget and adjusted path retransmission budget are reduced in processing block 305, the per-link delay parameters of the link on the path is adjusted so that less time can be consumed for retransmission. For example, for a link j of a path i, one or more of the following link parameters may be reduced: the link retransmission delay, $d_{i,j}^R$, the weighting parameters, $a_{i,j}$, $b_{i,j}$, the ARQ parameters, $ARQ\_BLOCK\_LIFETIME_{i,j}$, $RETRY\_LIMIT_{i,j}$, and so on. In another embodiment, for a path whose adjusted path delay budget and adjusted path retransmission budget are increased in processing block 305, the per-link delay parameters of the link on the path is adjusted so that more time can be consumed for retransmission. For example, for a link j of a path i, one or more of the following link parameters may be increased: the link retransmission delay, $d_{i,j}^R$, the weighting parameters, $a_{i,j}$, $b_{i,j}$, the ARQ parameters, $ARQ\_BLOCK\_LIFETIME_{i,j}$, $RETRY\_LIMIT_{i,j}$, and so on.

Note that the scope of these adjustments is limited by the transmission time offset so that there is no increase or decrease of the total delay of the synchronized multi-link transmission.

Figure 6:
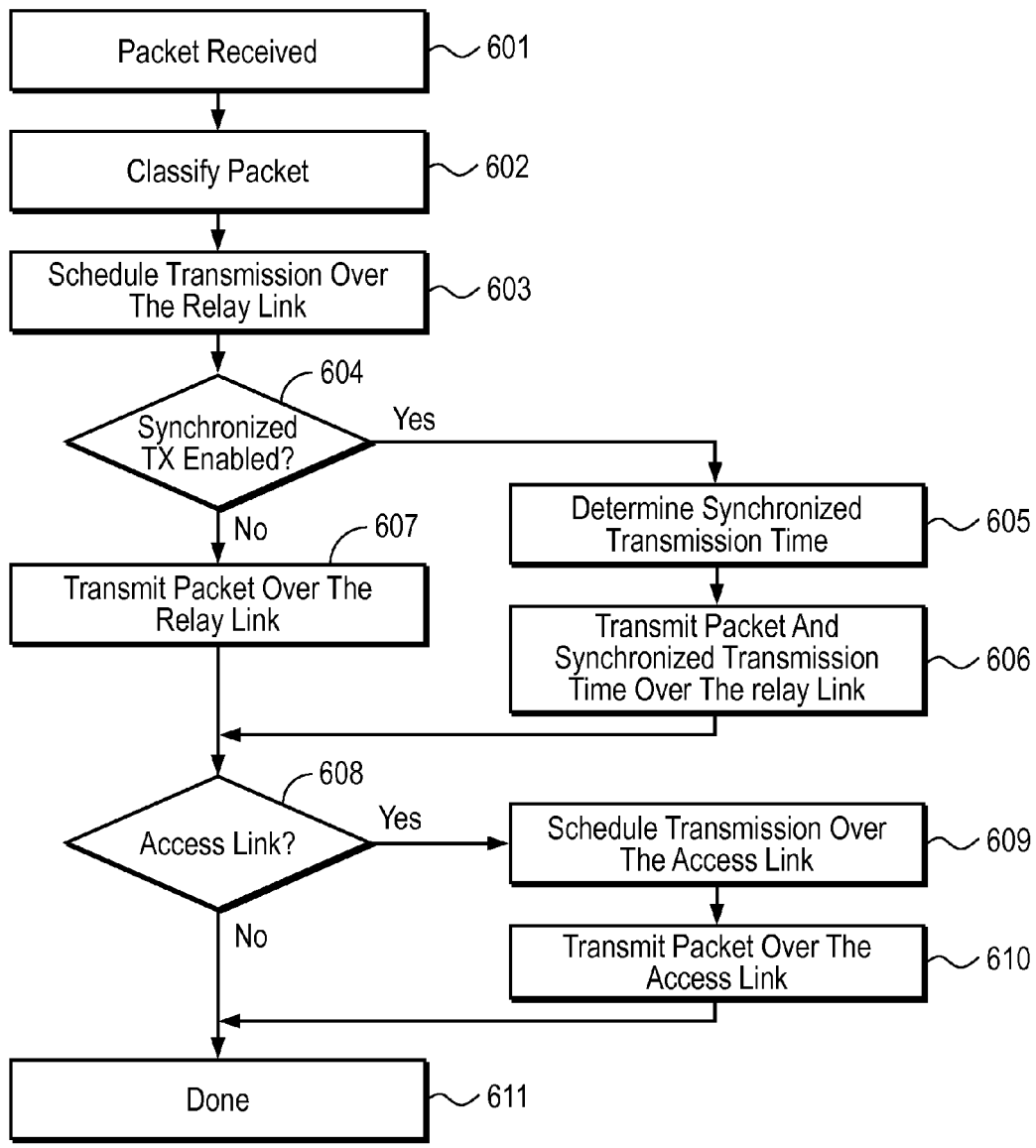
FIG. 6 is a flow diagram of one embodiment of a process for handling packets performed by a base station.

FIG. 6 is a flow diagram of one embodiment of a process for handling a packet when it is received by the base station. The process is performed by processing logic that may comprise hardware (circuitry, dedicated logic, etc.), software (such as is run on a general purpose computer system or a dedicated machine), or a combination of both Referring to FIG. 6, processing logic in the base station (e.g., a receiver unit) receives a packet (processing block 601). Optionally, processing logic (e.g., a packet classifier) classifies the packet to identify the requirements associated with the packet (processing block 602). Such requirements may include, but are not limited to, QoS, ARQ, synchronized multi-link transmission, routing, topology, ARQ, a power saving mode, which are all well-known in the art. The packets may be classified according to the values of the PHY header, PHY trailer, MAC header, MAC trailer, IP header, IP trailer, TCP/UDP header, TCP/UDP trailer, or any kinds of header, trailer, or body of a protocol unit in a manner well-known in the art. In one embodiment, the requirements are associated with a set of sequential packets that includes the received packet, and the set of packets is denoted herein as a connection, a service flow, a stream. The packet classification in this processing block may be the identification of the connection, the service flow, and the stream.

After packet classification, processing logic in the base station (e.g., a scheduler) schedules the packet for transmission over one or more relay links as determined by the topology and routing (processing block 603). These relay links include all the $1^{st}$ links of all the paths. In one embodiment, the scheduled relay transmission time of the $1^{st}$ relay link on the path i, $T_{ltx,i,1}$ is determined based on the QoS requirement, adjusted or unadjusted path delay parameters, link scheduling margin, ARQ status and windows. According to the topology, the packet may be scheduled for transmission multiple times over the multiple relay links. For example, with reference to the topology in FIG. 5, base station 501 is associated with two relay links, so the packet is scheduled twice unless a multicast or broadcast transmission covering both relay links is possible.

In one embodiment, in a frame based multi-hop network, the packet scheduling comprises the determination of a frame and optionally the position within the frame where the packet is to be transmitted. For example, in a frame based OFDM network, such as 802.16, a packet may be scheduled for transmission in a frame whose frame number is five, for example, and within the frame the packet may be transmitted using a set of sub-carriers and set of OFDM symbol time. Alternatively, when a network (or at least the base station and the relay stations that are part of the topology) is synchronized to a common reference clock, the scheduled transmission time may be denoted in terms of the common reference clock.

In one embodiment, when a packet is scheduled multiple times, the packet is first transmitted over the path that has the largest (unadjusted) path delay budget, and then transmitted over the other paths in the order of increasing link scheduling margin. Preferably, the difference of the first transmission and the transmission of the other path does not exceed the link scheduling margin associated with the path. This ensures the transmission time offset as determined by FIG. 3 can be applicable even when the packet is transmitted within the different frames or at the different reference time according to the paths.

Referring back to FIG. 6, after scheduling transmission over the relay links, processing logic in the base station (e.g., the scheduler) determines whether synchronized multi-link transmission is enabled for the packet (processing block 604). This operation is necessary in a network where some of the packets do not require synchronized multi-link transmission. If all the packets delivered in the network require synchronized transmission, this operation is not necessary, and the scheduler may go directly from processing block 603 to processing block 605. The determination in processing block 604 may be straightforward according to the classification of processing block 602. For example, in processing block 602, the packet may have been classified to a connection where the synchronized multi-link transmission is enabled. In such a case, synchronized multi-link transmission is enabled for the packet.

If the synchronized multi-link transmission is enabled for the packet, the process (and the base station) proceeds to processing block 605 where processing logic in the base station (e.g., the scheduler) determines the synchronized transmission time, $T_{Stx}$ based on the scheduled relay transmission time, the transmission time offset, other path or link adjusted or unadjusted delay parameters. In one embodiment, with the path i having the largest path delay budget, for example, the scheduled relay transmission time of the path, say $T_{ltx,i,1}$, is used. For example, $$T_{Stx} = T_{ltx,i,1} + T_{TxOff}$$

In another embodiment, the synchronized transmission time is determined based on the scheduled relay transmission time and the adjusted path delay budget. For example, $$T_{Stx} = \max_{i \in P}\{T_{ltx,i,1} + \tilde{D}_i\}$$

where P is a set of all paths on the network or the topology.

In one embodiment, the transmission time offset and other delay parameters are made available on or before performing processing block 605. For example, the transmission time offset may have been determined, using the scheduling process of FIG. 3, when the connection associated with the packet was created. Alternatively, the transmission time offset may be determined after the packet arrived and is being processed in processing block 605.

Figure 7:
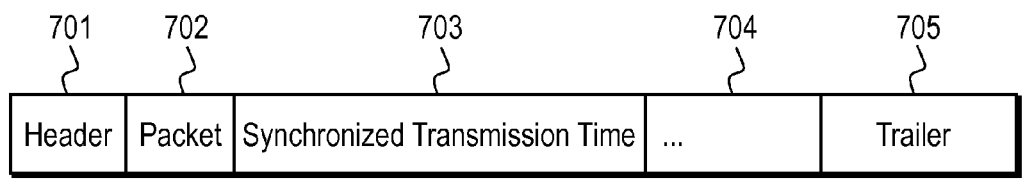
FIG. 7 illustrates one embodiment of a frame format.

After the synchronized transmission time has been determined, at the scheduled relay transmission time, processing logic in the base station (e.g., the transmitter) transmits the packet and the information on the synchronized transmission time (processing block 606). In one embodiment, the packet and the information are transmitted together, for example, within the same frame, within the same burst, or within the same messages. FIG. 7 shows an exemplary frame format where the packet and the information are included in a single frame. Referring to FIG. 7, the frame format includes a header 711, a packet 702, a synchronized transmission time 703, optional section 704 (e.g., storing other messages or packets that may not be relevant to the synchronized transmission but that may be piggybacked to take advantage of unused space of the frame), and a trailer 705.

If the packet is scheduled for transmission over multiple relay links, it may be transmitted multiple times according to the scheduling decision made at processing block 603. If ARQ is enabled over the link on which the packet is transmitted, one embodiment of the ARQ mechanism is initiated upon the transmission of the packet, and may be running in parallel with the packet processing of FIG. 6.

Figure 8:
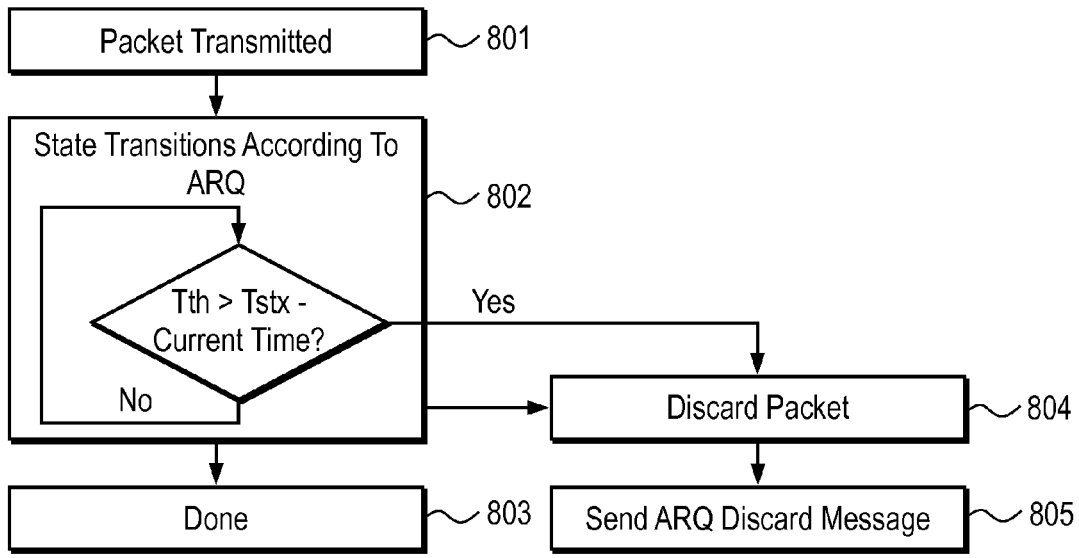
FIG. 8 is a flow diagram for one embodiment of a process for performing ARQ in a transmitter.

FIG. 8 is a flow diagram of one embodiment of an exemplary ARQ mechanism for a transmitter. The process is performed by processing logic that may comprise hardware (circuitry, dedicated logic, etc.), software (such as is run on a general purpose computer system or a dedicated machine), or a combination of both.

Referring to FIG. 8, processing logic transmits a packet (processing block 801), for example, according to the packet processing as presented in processing block of FIG. 6. The, processing logic causes one or more ARQ state transitions to occur according to the ARQ described herein (processing block 802), resulting in either successful packet transmission (and the process transitioning to processing block 803) or unsuccessful packet transmission where the packet is discarded as part of processing block 804. Any ARQ scheme where synchronized multi-link transmission is not considered can be adapted to the ARQ described herein by adding an event where the ARQ state transits to the state where the pending packet is discarded. In one embodiment, the event is defined as a situation where the packet is not likely to reach to the access stations in time for the synchronized transmission time. In such an event, it is of no merit either to continue the ARQ process or to deliver the packet to the subordinate relay stations and the access stations that are on the forward path. The packet, therefore, can be discarded in order to reduce the unnecessary packet retransmission. The new state transition captures such an observation; if the event occurs, the packet is discarded in processing block 804. As long as the event does not occur, ARQ state may transition according to the usual ARQ (for example, according to the state diagram of FIG. 2), and ARQ state transitions happen according to the usual ARQ, resulting in either successful packet transmission (processing block 803) or unsuccessful packet transmission where the packet is discarded (processing block 804).

When a packet is discarded in processing block 804, the base station sends an ARQ discard message for the packet, instructing the receiver to discard the packet (processing block 805). Upon receiving the message, the receiver discards the packet, and in one embodiment transmits an acknowledgement message in response to the ARQ discard message. Then both the transmitter and the receiver may advance the ARQ windows associated with the packet. This ensures the two ARQ states (one of the transmitter, e.g., the base station and the other of the receiver) to be in sync even when a packet is discarded.

In FIG. 8, an exemplary event and associated state transitions are illustrated according to one embodiment of the present invention. In one embodiment, the event is defined based on the synchronized transmission time, the current time, and a parameter referred to herein as the transmission threshold. For example, the event occurs when the remaining time before the synchronized transmission time is less than the transmission threshold. The threshold may be determined based on one or more of the followings: the link retransmission delays for the links on the path, the channel characteristics of the links on the path, the topology of the multi-hop network, QoS requirements including delay requirements and/or packet loss requirements, the normal path delay and the path retransmission budget for the path.

In one embodiment, the transmission threshold is simply set to zero. In such a case, if the event occurs, that is, if the current time passed the synchronized transmission time, the packet already missed the synchronized transmission time. Therefore, there would be no need to continue ARQ process or to forward the packet.

In another embodiment, the threshold is set to the normal path delay, which is the sum of the normal link delays for the links from the base station and the access station. Let us consider the 1$^{st}$ path in the topology example of FIG. 5. In such a case, if the event occurs, it means that the current time did not pass the synchronized transmission time but the remaining time before the synchronized transmission time is not enough considering the normal path delay. Therefore, there would be no need to continue ARQ process or to forward the packet.

In yet another embodiment, the threshold is set to the sum of the normal path delay and the reasonable time for retransmissions over one or more links in the path. In one embodiment, the reasonable time is determined based on the link retransmission delays for the links on the path, the channel characteristics of the links on the path, the topology of the multi-hop network, QoS requirements including delay requirements and/or packet loss requirements, the normal path delay and the path retransmission budget for the path, adjusted or unadjusted link or path delay parameters. In one embodiment, the reasonable time can be one or more link retransmission delays for one or more links in the path where the channel errors are anticipated. As another example, the reasonable time can be the ARQ block lifetime for one or more links where the channel status is very bad in such a way that ARQ block lifetime may expire.

Figure 2:
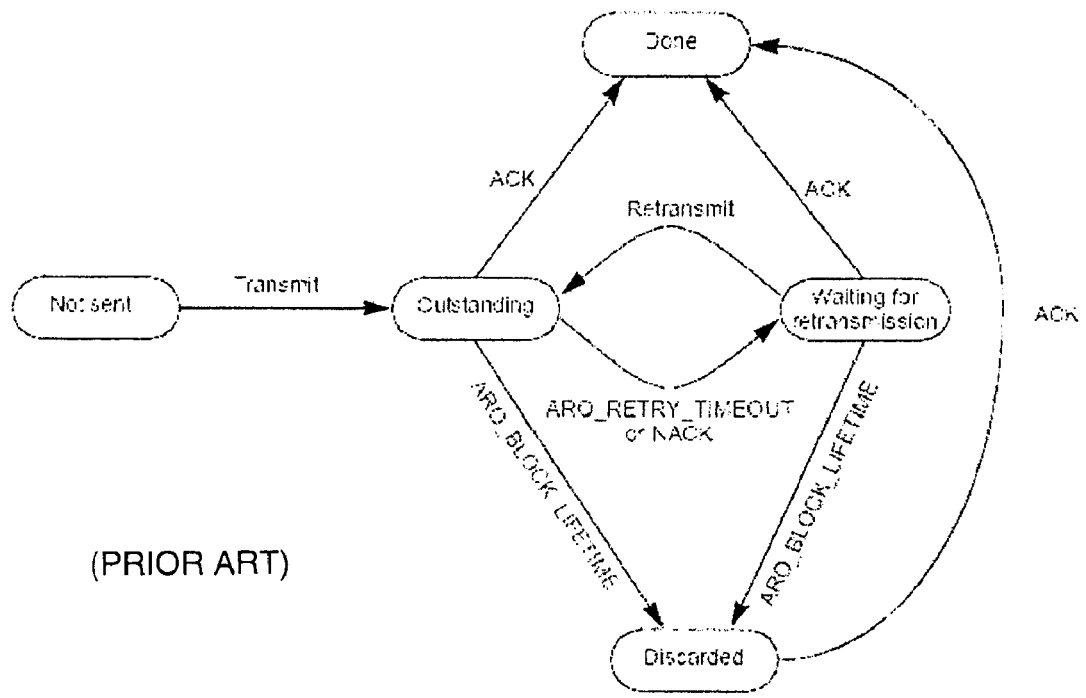
FIG. 2 illustrates an ARQ state diagram for a transmitter.
Figure 9:
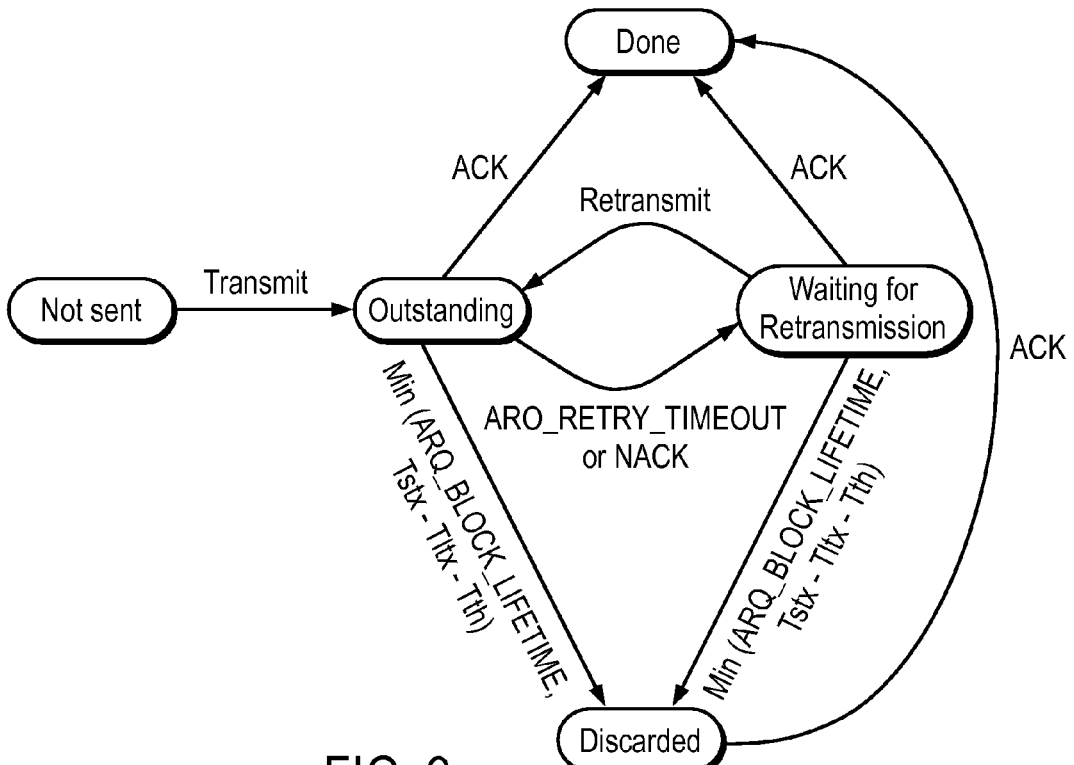
FIG. 9 illustrates one embodiment of an ARQ state diagram for a transmitter.

FIG. 9 shows one embodiment of an exemplary ARQ state diagram of FIG. 2 as modified to incorporate the event and the state transitions according to one embodiment of the present invention. In this embodiment, the event is identified by the expiration of a timer whose value is obtained based on the relay transmission time $T_{ltx}$, the synchronized transmission time $T_{Stx}$, and the transmission threshold $T_{th}$. For example, the timer $T_{Timer}$ is set to the value obtained by the following equation upon transmitting the packet at the relay transmission time $T_{ltx}$.

$$T_{Timer} = T_{Stx} - T_{ltx} - T_{th}$$

Because the exemplary ARQ state diagram of FIG. 2 has a timer for a packet-discard that expires after ARQ_BLOCK_LIFETIME, the techniques described herein can be incorporated by taking the minimum of $T_{Timer}$ and ARQ_BLOCK_LIFETIME as the new timer value for the packet discard.

Referring back to FIG. 6, if the base station determines that the synchronized multi-link transmission is not enabled for the packet, the process transitions to processing block 607 and processing logic in the base station (e.g., the transmitter) transmits the packet over the relay link at the relay transmission time scheduled determined at processing block 603. The packet may be transmitted once or multiple times according to the scheduling decision made at processing block 603. Also, if ARQ is enabled over the relay link on which the packet is transmitted, the ARQ mechanism is initiated upon the transmission of the packet. Note that the ARQ mechanism need not be the ARQ described herein because the synchronized multi-link transmission is not enabled on that packet. For example, the exemplary ARQ of FIG. 2 may be used in processing block 607.

After transmitting the packet, processing logic (e.g., the base station scheduler) determines whether the base station serves an access link for the packet (processing block 608). In the exemplary topologies of FIGS. 4 and 5, the base station does not serve an access link. In such a case, the base station proceeds to processing block 611, and the processing of the packet is finished. Although so illustrated in FIG. 6, this decision may not need to be made per packet basis. For example, if the decision does not change during the entire operation of the base station or during the lifetime of a connection, the base station may determine whether the base station serves an access link once for the entire operation or once for the lifetime of a connection and may skip processing block 608 other times.

If the base station does serve an access link for the packet, the process transitions to processing block 609 where processing logic (e.g., the base station scheduler) schedules the transmission of the packet at the synchronized transmission time as determined in processing block 605. Then, processing logic (e.g., the base station transmitter) transmits the packet over the access link as scheduled at processing block 609 (processing block 610). In one embodiment, the packet is also transmitted over all the other access links (i.e., synchronized links) at the same time, according to the packet processing of the relay station as explained in the following.

Figure 10:
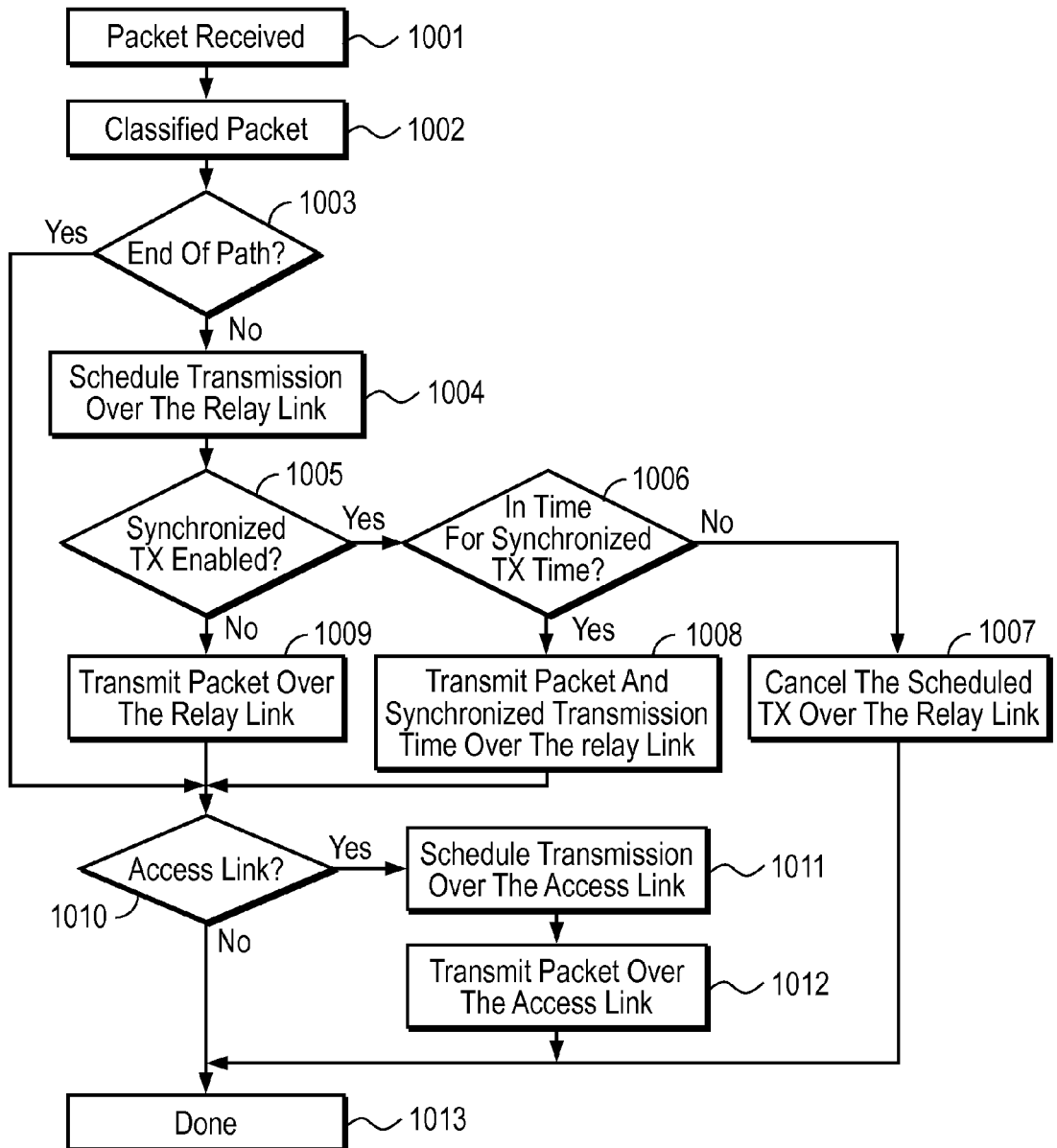
FIG. 10 is a flow diagram of one embodiment of process for handling packets performed by a relay station.

FIG. 10 is a flow diagram of one embodiment of a process for processing a packet received by a relay station. The process is performed by processing logic that may comprise hardware (circuitry, dedicated logic, etc.), software (such as is run on a general purpose computer system or a dedicated machine), or a combination of both.

Referring to FIG. 10, processing logic in the relay station receives a packet (processing block 1001). The synchronized transmission time may also be available at the time the processing logic receives the packet if the base station transmitted it together with the packet. If it was transmitted separately, it should be available before the relay station reaches processing block 1006.

After receiving the packet, optionally, processing logic classifies the packet to identify the requirements associated with the packet (processing block 1002). As in processing block 602 of FIG. 6, the requirements may include QoS, ARQ, synchronized multi-link transmission, routing, topology, and ARQ, and the packet classification may be the identification of the connection, the service flow, and the stream.

After receiving the packet and performing any packet classification, processing logic in the relay station determines whether it is the end of the path for all the paths that traverse the station (processing block 1003). For example, the relay station, RS2, of the topology example of FIG. 5 is the end of the $2^{nd}$ path but is not the end of the $3^{rd}$ path. On the other hand, RS3 (and RS1 also) has only one path traversing it and is the end of the path. Although not illustrated in FIG. 10, this decision may not need to be made per packet basis. For example, if the decision does not change during the entire operation of the relay station or during the lifetime of a connection, the relay station may perform processing block 1003 once for the entire operation or once for the lifetime of a connection and may skip processing block 1003 other times.

If the relay station is the end of the path for all the paths, then the processing for the relay of the packet (i.e. processing blocks 1004-1009) is not necessary, so it proceeds to processing block 1010 to process as an access link if necessary. Otherwise, the process transitions to processing block 1004.

At processing block 1004, processing logic in the relay station schedules the transmission of the packet over the next relay links as determined by the topology, routing, and so on. The processing is basically the same as processing block 603 of FIG. 6 except that the information for the relay station is used instead of that for the base station. In one embodiment, a relay station at the j-th link of the i-th path uses the part of the topology and the link scheduling margin, $D_{i,j}^{SM}$, that are relevant to it, instead of using those of the base station. The scheduled relay transmission time of the j-th relay link on the path i, is denoted herein as $T_{ltx,i,j}$ for the sake of the explanation.

After scheduling transmission, processing logic in the relay station determines whether synchronized multi-link transmission is enabled for the packet (processing block 1005). In one embodiment, this is performed in the same way the base station determines it in processing block 604 of FIG. 6.

Figure 11:
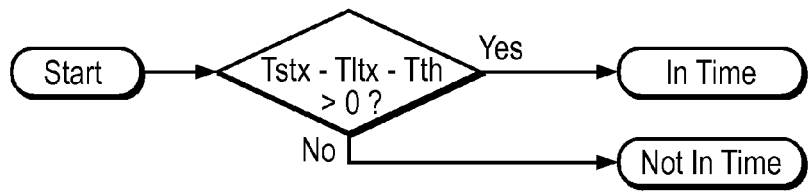
FIG. 11 is a flow diagram of one embodiment of a process for determining whether a packet is in time for synchronized transmission.

If the synchronized multi-link transmission is enabled for the packet, the process transitions to processing block 1006 where processing logic in the relay station determines whether the packet is in-time for the synchronized transmission time. If the relay station is on the multiple paths to the multiple access stations, the processing logic considers each path separately. In one embodiment, the relay station on j-th link of i-th path determines that the packet is in time for the path i based on the synchronized transmission time $T_{stx}$, the scheduled relay transmission time $T_{ltx,i,j}$, and the transmission threshold $T_{th,i,j}$. In one embodiment as shown in FIG. 11, the relay station decides the packet is in time if the synchronized transmission time $T_{stx}$ is greater than the relay transmission time $T_{ltx,i,j}$ by the transmission threshold $T_{th,i,j}$.

The threshold may be determined based on one or more of the followings: the link retransmission delays for the links on the forward path, the channel characteristics of the links on the forward path, the topology of the multi-hop network, QoS requirements including delay requirements and/or packet loss requirements, the normal forward path delay and the path retransmission budget for the forward path.

In one embodiment, the transmission threshold is simply set to zero. In such a case, if the relay transmission time is scheduled after the synchronized transmission time, the packet already missed the synchronized transmission time. Therefore, the packet is determined to be not in time.

In another embodiment, the threshold is set to the normal forward path delay, which is the sum of the normal link delays for the links from the relay station and the access station (that is the links in the forward path). Let us consider the $3^{rd}$ path in the topology example of FIG. 5. In such a case, the threshold is set to the normal forward path delay of the path 3 as viewed by the relay station, which is a normal link delay of the $2^{nd}$ link of the $3^{rd}$ path. Unless the synchronized transmission time is greater than the relay transmission time by the normal link delay of the $2^{nd}$ link of the $3^{rd}$ path, the packet may not reach the access link (RS3) in time for the synchronized transmission.

In yet another embodiment, the threshold is set to the sum of the normal forward path delay and the reasonable time for retransmissions over one or more links in the forward path. The reasonable time can be determined based on the link retransmission delays for the links, the channel characteristics of the links, the topology of the multi-hop network, QoS requirements including delay requirements and/or packet loss requirements, the normal forward path delay and the path retransmission budget for the path, and adjusted or unadjusted link or path delay parameters. For the topology example of FIG. 5, in one embodiment, the reasonable time may be one or more link retransmission delays over the $2^{nd}$ link of the $3^{rd}$ path.

If there is a path that is a sub-path of another path, processing block 1005 may be performed only for the sub-path. This is because the sub-path is the shorter of the two paths, and if a packet is in time for a path, it needs to be transmitted over the next relay link regardless of whether it is in time for the other path.

If two paths are not sharing any relay links, processing block 1005 may be independently performed for each of the two paths. According to the results of processing block 1005, the subsequent processing blocks, either processing blocks 1007 or 1008, may also be performed independently. For example, a packet may be in time for a path while it is not for another path. In such a case, the packet is transmitted only over the former path.

If a packet is in time for a path, processing logic in the relay station transmits the packet and the information on the synchronized transmission time over the relay link (processing block 1008). As in processing block 606 of FIG. 6 the packet and the information may be transmitted together, for example, within the same frame, within the same burst, or within the same messages. If the packet is scheduled for transmission over multiple relay links, it may be transmitted multiple times according to the scheduling decision made at processing block 1004. If ARQ is enabled over the link on which the packet is transmitted, the ARQ mechanism described herein is initiated upon the transmission of the packet, and may be running in parallel with the subsequent packet processing. Any ARQ of embodiments of the present invention as illustrated with reference to FIG. 6 may be used by the relay station as well. After the transmission, the relay station proceeds to processing block 1010.

If a packet is not in time for a path, processing logic in the relay station cancels the scheduled packet transmission over the path (processing block 1007) and proceeds to processing block 1013. There is no need to transmit the packet because it is not likely to reach the access link before the synchronized transmission time. Again, this is another aspect of the techniques described herein that reduce the unnecessary packet transmission.

If the synchronized multi-link transmission is not enabled for the packet, the process transitions to processing block 1009 where the processing logic transmits the packet over the relay link at the relay transmission time scheduled at processing block 1004. The packet may be transmitted once or multiple times according to the scheduling decision made at processing block. Also, if ARQ is enabled over the relay link on which the packet is transmitted, the ARQ mechanism is initiated upon the transmission of the packet, but the ARQ mechanism need not be the ARQ mechanism described above because the synchronized multi-link transmission is not enabled on that packet.

Next, processing logic determines whether the relay station serves an access link for the packet (processing block 1010). If the relay station does not serve an access link, the process transitions to processing block 1013, and the processing of the packet is finished.

If the relay station does serve an access link for the packet, the process transitions to processing block 1011 where processing logic schedules the transmission of the packet at the synchronized transmission time as received from the base station. Then, processing logic transmits the packet over the access link as scheduled at processing block 1011 (processing block 1012). Note that the base station and all the other access stations transmit the packet at the same time over the synchronized links.

Figure 12:
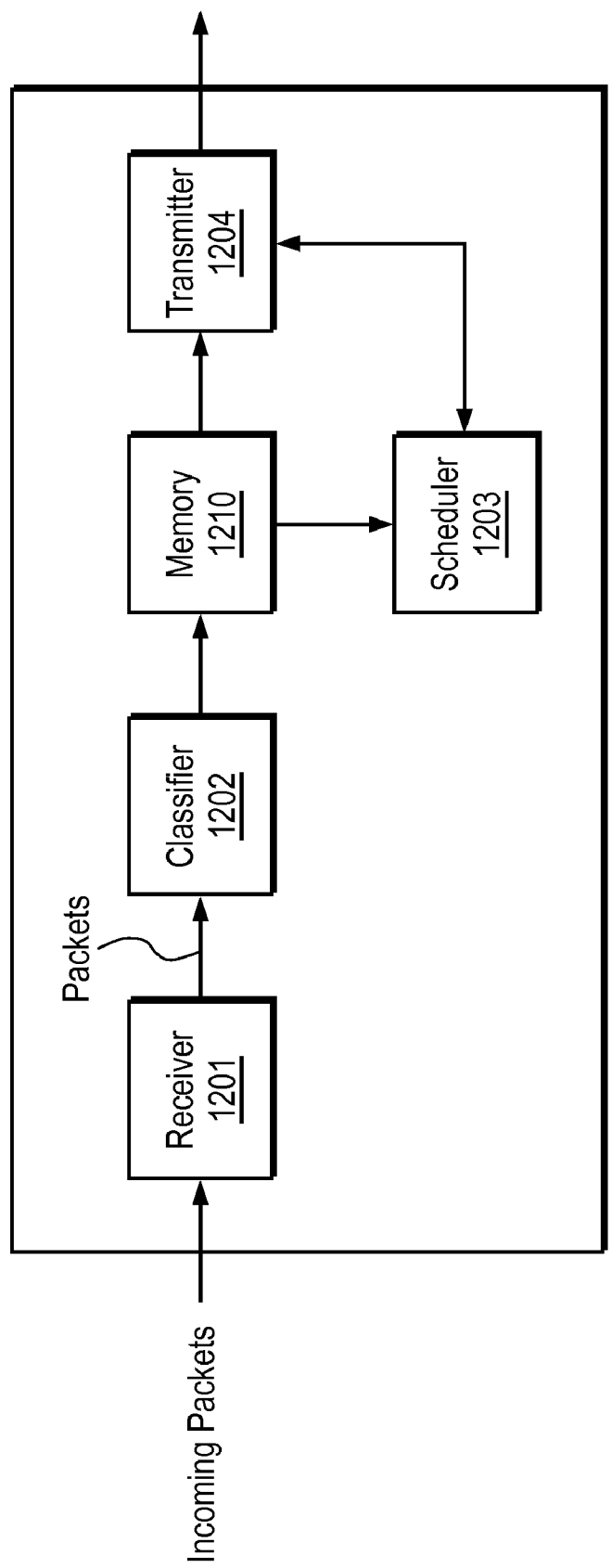
FIG. 12 is a block diagram of one embodiment of a station.

FIG. 12 is a block diagram of one embodiment of a station. In one embodiment, the station is a base station that operates as described in FIG. 6 above. Referring to FIG. 12, base station 1200 comprises a receiver 1201, a packet classifier 1202, a scheduler 1203 and a transmitter 1204. The receiver 1201 receives a packet. Packet classifier 1202 classifies the packet to identify the requirements associated with the packet. This is optional. The packets are stored in buffer memory 1210. Then scheduler 1203 schedules the packet for transmission over one or more relay links and/or access links as described above in conjunction with FIG. 6. After the transmission time has been determined, at the scheduled transmission time, transmitter 1204 transmits the packet and/or the information on the synchronized transmission time over the relay links and/or the access links. Note that a control unit (not shown) controls each of these units. Note that the station may be a relay station and operate as described above in FIG. 10.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for use in an Automatic Repeat-reQuest (ARQ)-enabled multi-hop network to support synchronized transmission over a specific set of synchronized links, the method comprising:

performing pre-transmission of a packet to hops to enable a base station and the plurality of hops in the network to transmit the packet synchronously to one or more mobile stations in the wireless communication system;

performing one or more re-transmissions of the packet at a set of one or more hops forming a path in the network if time remaining before a synchronized transmission time for the path as a whole is greater than a threshold; and discarding a packet in a link if an ARQ block lifetime expires for the packet, and a path retransmission budget for a path is large enough to accommodate a link retransmission delay of a link on the path from the base station to the access station but smaller than the sum of the ARQ block lifetime for all the links in the path.

2. The method defined in claim 1 further comprising determining the synchronized transmission time of the packet over the synchronized links, and wherein performing one or more re-transmissions of the packet at the set of one or more hops forming a path in the network comprises resending the packet between any two stations on a path according to ARQ on at least one of the links on the path if time remaining for the path as a whole before the synchronized transmission is greater than a threshold.

3. The method defined in claim 2 wherein determining a synchronized transmission time of the packet over the synchronized links is based on a transmission time offset and the link transmission time of the packet.

4. The method defined in claim 3 further comprising:

determining a normal link delay and a link retransmission delay for each relay link on each path from the base station to an access station that is associated with a synchronized link;

determining the transmission time offset based on the normal link delays and the link retransmission delays;

determining, upon arrival of the packet at the base station, a link transmission time of the packet over the next relay link.

5. The method defined in claim 4 wherein determining the link transmission time of the packet over the next relay link is based on one or more of packet arrival time, packet processing time of the base station, and Quality of Service (QoS) provisioning of the packet.

6. The method defined in claim 5 wherein determining the link transmission time of the packet over the next relay link occurs upon arrival of the packet at the base station.

7. The method defined in claim 3 further comprising determining, for each path from the base station to an access station, a normal path delay for the path based on a sum of all the normal link delays for the links on the path, when determining the transmission time offset.

8. The method defined in claim 3 further comprising determining, for each path from the base station to an access station, a path retransmission budget based on the link retransmission delays for the links on the path, when determining the transmission time offset.

9. The method defined in claim 8 wherein path retransmission budget is based on one or more of a group consisting of: channel characteristics of the links on the path, the topology of the multi-hop network, QoS requirements including delay requirements or packet loss requirements, a normal path delay and a path retransmission budget for other paths.

10. The method defined in claim 8 wherein a path retransmission budget for a path is large enough to accommodate a link retransmission delay of a link on the path from the base station to the access station but smaller than the sum of the link retransmission delays of the path.

11. The method defined in claim 3 further comprising determining, for each path from the base station to an access station, a path delay budget for the path based on the sum of the normal path delay and the path retransmission budget, when determining the transmission time offset.

12. The method defined in claim 3 wherein determining the transmission time offset is based on taking the maximum value among the path delay budgets for all the paths.

13. The method defined in claim 1 further comprising discarding a packet in an ARQ-enabled link if time remaining before a synchronized transmission time for the path as a whole is less than a threshold by a transmitting station sending an ARQ discard message for the packet to a receiving station.

14. The method defined in claim 13 further comprising the receiving station discarding the packet and sending an acknowledgement for the ARQ discard message when receiving an ARQ discard message for a packet from the transmitting station.

15. The method defined in claim 13 wherein discarding a packet comprises a station advancing the ARQ windows associated with the packet.

16. The method defined in claim 1 wherein the threshold is determined based on one or more of a group consisting of: link retransmission delays for the links on a forward path, channel characteristics of the links on the forward path, the topology of the multi-hop network, QoS requirements including delay requirements or packet loss requirements, a normal forward path delay and a path retransmission budget for the path.

17. The method defined in claim 1 wherein the threshold is zero.

18. The method defined in claim 1 wherein threshold is a normal forward path delay.

19. The method defined in claim 1 wherein the threshold is the sum of a normal forward path delay and one or more link retransmission delays for one or more links in the forward path.

20. The method defined in claim 1 wherein the threshold is the sum of a normal forward path delay and an ARQ block lifetime for one or more links in the forward path.

21. The method defined in claim 1 wherein determining the link retransmission delay for a link is based on the time required for an ARQ retransmission over the link.

22. The method defined in claim 1 wherein determining a normal forward path delay for each wireless station on a path from the base station to an access station is based on the sum of the normal link delays for the links from the wireless station and the access station.

23. A method for use in an Automatic Repeat-reQuest (ARQ)-enabled multi-hop network to support synchronized transmission over a specific set of synchronized links, the method comprising:
  performing pre-transmission of a packet to hops to enable a base station and the plurality of hops in the network to transmit the packet synchronously to one or more mobile stations in the wireless communication system;
  performing one or more re-transmissions of the packet at a set of one or more hops forming a path in the network if time remaining before a synchronized transmission time for the path as a whole is greater than a threshold; and
  discarding a packet in a link if the number of retransmission of a packet exceeds a retry limit of the link, and a path retransmission budget for a path is large enough to accommodate a link retransmission delay of a link on the path from the base station to the access station but smaller than the sum of the time required for the retry limit number of times of retransmission.

24. An article of manufacture having one or more non-transitory computer readable storage media storing instructions which, when executed by a system, cause the system to perform a method for use in an Automatic Repeat-reQuest (ARQ)-enabled multi-hop network to support synchronized transmission over a specific set of synchronized links, the method comprising:
  performing pre-transmission of a packet to hops to enable a base station and the plurality of hops in the network to transmit the packet synchronously to one or more mobile stations in the wireless communication system;
  performing one or more re-transmissions of the packet at a set of one or more hops forming a path in the network if time remaining before a synchronized transmission time for the path as a whole is greater than a threshold; and
  discarding a packet in a link if an ARQ block lifetime expires for the packet, and a path retransmission budget for a path is large enough to accommodate a link retransmission delay of a link on the path from the base station to the access station but smaller than the sum of the ARQ block lifetime for all the links in the path.

* * * * *